No. 752,306. PATENTED FEB. 16, 1904.
W. SOMERVILLE.
DISK PLOW OR HARROW.
APPLICATION FILED MAR. 23, 1901.
NO MODEL.
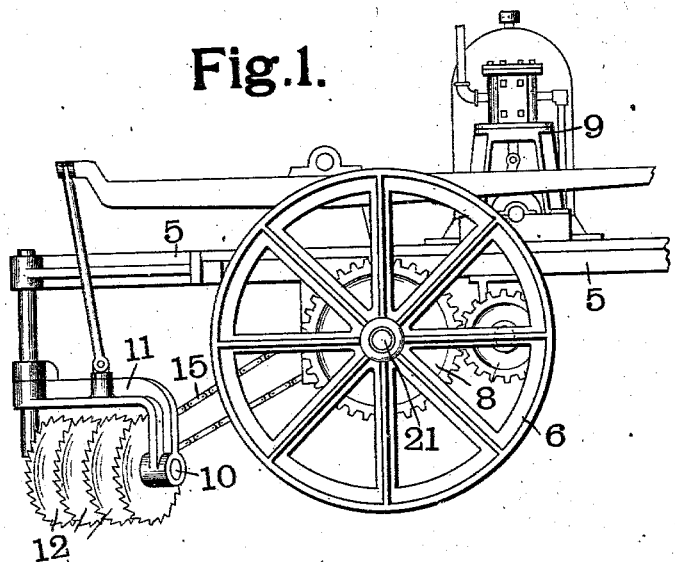
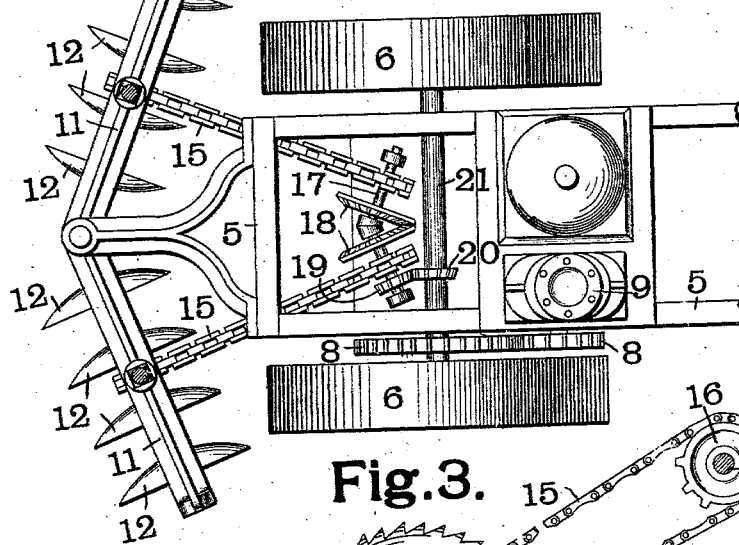
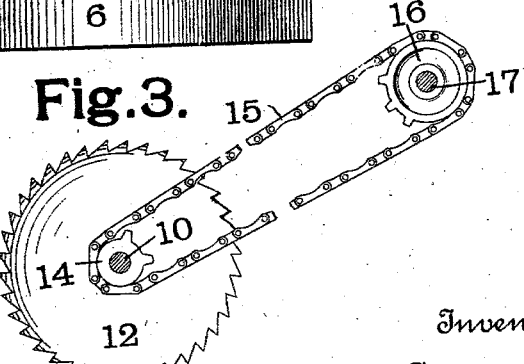
Witnesses
Inventor
Wm. Somerville
By Attorneys No. 752,306.

Patented February 16, 1904.

UNITED STATES PATENT OFFICE.

WILLIAM SOMERVILLE, OF ST. LOUIS, MISSOURI.

DISK PLOW OR HARROW.

SPECIFICATION forming part of Letters Patent No. 752,306, dated February 16, 1904.

Application filed March 23, 1901. Serial No. 52,626. (No model.)

*To all whom it may concern:*

Be it known that I, WILLIAM SOMERVILLE, a citizen of the United States, residing at the city of St. Louis, in the State of Missouri, have invented a certain new and useful Disk Plow or Harrow, of which the following is such a full, clear, and exact description as will enable any one skilled in the art to which it appertains to make and use the same, reference being had to the accompanying drawings, forming part of this specification.

In all disk plows or harrows heretofore constructed, so far as I am aware, the disks have been frictionally rotated by their contact with the ground.

It is the object of my invention to provide means for positively rotating the disks of a disk plow or harrow, thus lessening the resistance of the disks and increasing the amount and speed of the work of the plow or harrow.

In the accompanying drawings, which show so much of one form of a disk plow or harrow as is necessary to illustrate my invention, Figure 1 is a side elevation. Fig. 2 is a top plan view, some of the parts being removed; and Fig. 3 is an enlarged sectional view showing a detail of construction.

Like marks of reference refer to similar parts in the several views of the drawings.

5 is the body of the plow or harrow, which is mounted upon wheels, as usual. Only the rear or driving wheels 6 are shown in the drawings. The wheels 6 are driven through gearing 8 by motor 9, mounted on the body 5.

10 represents two shafts which are journaled in brackets 11, carried at the rear of the body 5. On each of the shafts 10 are a number of disks 12. These disks 12 are dish-shaped and have their concave faces turned outwardly, as is usual. They are preferably provided on their periphery with teeth, so as to facilitate their passage through the ground. The disks 12 in place of being loosely mounted upon the shafts 10, as is usual, are rigidly mounted on said shafts. On each of the shafts 10 is rigidly mounted a sprocket-wheel 14. Passing around each of the sprocket-wheels 14 is a sprocket-chain 15, which also passes around a sprocket-wheel 16, mounted on a shaft 17. The shafts 17 are geared together by beveled gear-wheels 18. On one of the shafts 17 is a beveled gear-wheel 19, which meshes with the beveled gear-wheel 20 on the axle 21 of the driving-wheels 6.

In the operation of my plow or harrow the power is imparted to the driving-wheels 6 by means of the engine 9. This propels the plow or harrow and at the same time through the sprocket-chains 15 positively drives the cutting-disks 12, thus lessening their resistance and increasing the amount of work done by the plow. The formation of the teeth in the peripheries of the disks also facilitates the work of the plow or harrow.

I am aware that pulverizing-machines have been heretofore constructed in which revolving knives carried by a vehicle-body have been driven by a traction-engine adapted to draw the vehicle-body, and therefore do not claim such construction.

Having fully described my invention, what I claim as new, and desire to secure by Letters Patent of the United States, is—

In a disk plow or harrow, the combination with a vehicle-body, of a motor carried thereby, a pair of shafts carried by said vehicle-body and set at an angle to each other, a plurality of cutting-disks fixed to said shafts and capable of movement to and from the ground, a second pair of shafts journaled on the frame and also set at an angle to each other and provided with bevel-gears meshing with each other, a sprocket-chain running from one set of shafts to the other; and means for driving said bevel-gears from said motor, substantially as described.

In testimony whereof I have hereunto set my hand and affixed my seal in the presence of two subscribing witnesses.

WM. SOMERVILLE. [L. S.]

Witnesses:
JAMES H. BRYSON,
W. A. ALEXANDER.